(12) United States Patent
Kerr et al.

(10) Patent No.: US 8,714,202 B2
(45) Date of Patent: May 6, 2014

(54) PIPE REPAIR DEVICE

(76) Inventors: Stephen A. Kerr, West St. Paul (CA); Cameron G. Huber, Winnipeg (CA)

(*) Notice: Subject to any disclaimer, the term of this patent is extended or adjusted under 35 U.S.C. 154(b) by 27 days.

(21) Appl. No.: 13/520,757

(22) PCT Filed: Jan. 4, 2011

(86) PCT No.: PCT/CA2011/000004
§ 371 (c)(1),
(2), (4) Date: Jul. 5, 2012

(87) PCT Pub. No.: WO2011/082478
PCT Pub. Date: Jul. 14, 2011

(65) Prior Publication Data
US 2012/0279601 A1 Nov. 8, 2012

Related U.S. Application Data

(60) Provisional application No. 61/293,428, filed on Jan. 8, 2010.

(51) Int. Cl.
*F16L 55/16* (2006.01)
(52) U.S. Cl.
USPC .............................................. 138/99; 138/97
(58) Field of Classification Search
USPC ...................................... 138/99, 98
See application file for complete search history.

(56) References Cited

U.S. PATENT DOCUMENTS

| | | | | |
|---|---|---|---|---|
| 518,805 | A * | 4/1894 | Cooper | 138/99 |
| 2,417,741 | A * | 3/1947 | Dillon | 285/373 |
| 2,708,951 | A | 5/1955 | Risley | |
| 4,465,330 | A * | 8/1984 | De Cenzo | 439/92 |
| 5,692,544 | A * | 12/1997 | Friedrich et al. | 138/99 |
| 7,464,971 | B2 * | 12/2008 | Bennett | 285/373 |

FOREIGN PATENT DOCUMENTS

| | | |
|---|---|---|
| CA | 1308043 | 9/1992 |
| EP | 1278982 | 1/2003 |
| FR | 2662489 | 11/1991 |

* cited by examiner

*Primary Examiner* — Patrick F Brinson
(74) *Attorney, Agent, or Firm* — Ryan W. Dupuis; Kyle R. Satterthwaite; Ade + Company Inc.

(57) ABSTRACT

A repair device for repairing a leaking section in a pipe includes a sealing member of resilient material which fully surrounds the leaking section. The sealing member includes first and second annular sealing faces arranged for sealing engagement with the pipe about a full circumference thereof on opposite sides of the leaking section, and an envelope section fully spanning between the first and second annular sealing faces. The envelope section, the first annular sealing face, and the second annular sealing face are formed of resilient sealing material integrally joined with one another A rigid housing surrounds the sealing member and a clamp compresses the sealing member between the rigid housing and the leaking section of the pipe about the full circumference.

19 Claims, 11 Drawing Sheets

PIPE REPAIR DEVICE

This application is a national phase filing of PCT/CA2011/000004 and claims the benefit under 35 U.S.C. 119(e) of U.S. provisional application Ser. No. 61/293,428, filed Jan. 8, 2010.

FIELD OF THE INVENTION

The present invention relates to a repair device arranged to be clamped onto a pipe to repair a leak in the pipe, and more particularly, the present invention relates to a pipe repair device which is arranged to be clamped over a pipe coupling in a pipe in a high pressure air delivery system to repair a leak in the pipe coupling.

BACKGROUND

High pressure air systems, for example the type used in mines and the like, commonly have many pipes distributed to different areas of the system involving many pipe couplings where there is a potential for leakage and loss of pressure. A typical pipe coupling joins two pipe ends which have annular grooves formed therein to receive respective annular sealing members therein. The pipe coupling comprises a metal body arranged to be clamped over the pipe ends and the sealing members received in the grooves therein to both join the pipe ends to one another as well as to seal the pipe ends to the clamp body of the pipe coupling. The small cross section of sealing material in the grooves has potential to deteriorate quickly in the corrosive environment of mines and the like so that the resulting pipe couplings leak and lose pressure. The loss in air pressure must be overcompensated by pressurizing more air into the system which consumes costly operating resources. Repairing leaking pipe couplings typically requires the air system to be shut down to remove the coupling body and replace the sealing members. Shutting down the air system however results in costly down time. In the example of mines, the loss of productive time is more costly than the extra operating costs of overcompensating for leaks in the air pressure system.

Various pipe repair devices have been proposed in the prior art for repairing a leak in a pipe which may not require shutting down to remove pressure from the pipe. Examples can be found in the following U.S. Patents, U.S. Pat. No. 6,220,302 by Nolley, U.S. Pat. No. 7,126,579 by Borland, U.S. Pat. No. 2,230,287 by Curtis, U.S. Pat. No. 732,400 by Dresser et al and U.S. Pat. No. 4,756,338 by Guyatt et al.

Typical prior art configurations involve a small sealing member which is clamped between a rigid clamping body and the pipe resulting in many sealing surfaces which the sealing member must be in contact with. Failure of the seal can occur either at the interface of the sealing member with the pipe, or at the interface of the sealing member with the rigid clamp body surrounding the pipe so that there is a high probability of failure. Also the sealing material is prone to quick degradation in corrosive environments when provided in a small cross section between a clamped body and a pipe.

SUMMARY OF THE INVENTION

According to one aspect of the invention there is provided a repair device for repairing a leaking section in a pipe, the repair device comprising:

a sealing member comprising a first annular sealing face arranged for sealing engagement with the pipe about a full circumference thereof on one side of the leaking section, a second annular sealing face arranged for sealing engagement with the pipe about the full circumference thereof on the other side of the leaking section, and an envelope section spanning between the first and second annular sealing faces;

the envelope section being arranged to fully surround the leaking section of the pipe about the full circumference of the pipe between the first and second annular sealing faces;

the envelope section, the first annular sealing face, and the second annular sealing face comprising resilient sealing material and being integrally joined with one another; and a clamp extending circumferentially about the sealing member so as to be arranged to clamp the sealing member circumferentially about the pipe.

By providing a sealing member which comprises an envelope section to fully surround the leaking section such as a leaking pipe coupling between two sections of pipe, a large amount of sealing material is provided which is more resistant to degradation in corrosive environments such as air pressure systems in a mine. Furthermore, by providing a unitary envelope section, a minimum number of sealing surfaces are required to maintain a proper seal about the leaking section as there is only a single sealing interface between the sealing member and the pipe and no additional sealing interface is required between the sealing member and a surrounding clamp body as required in the prior art. Use of an extra housing surrounding the sealing member provides strength to the resilient material forming the sealing member but is not required to be relied upon for proper sealing of the leaking section in the pipe.

Preferably at least one vent aperture communicates through the resilient sealing material of the sealing member in which the vent aperture includes a vent member arranged to selectively close the vent aperture.

In some embodiments, a periphery of the vent aperture defines a valve seat at an inner side of the resilient sealing material, and the vent member comprises a wedge arranged for sealing engagement with the valve. In this instance, a fastener supported externally of the resilient sealing material is preferably arranged to clamp a portion of the resilient sealing material about the vent aperture between the fastener and the wedge in a closed position such that the wedge is effectively wedged into the vent aperture as the fastener is tightened by pulling the wedge radially outward through the aperture.

In some instance the envelope section, the first annular sealing face, and the second annular sealing face may comprise a single unitary member of resilient material arranged to full surround the leaking section of the pipe.

Alternatively, the envelope section may comprise a plurality of circumferential sections in which each circumferential section is arranged to extend partway about a circumference of the leaking section, and each circumferential section is integrally joined with a respective portion of each of the first and second annular sealing faces. Preferably the plurality of circumferential sections are bonded to one another such that the envelope section, the first annular sealing face and the second annular sealing face form a single member of resilient material arranged to fully surround the leaking section of the pipe.

The envelope section may comprise a cylindrical outer wall and a pair of end walls spanning radially between respective ones of the annular sealing faces and the outer wall.

Preferably there is provided at least one seam in the sealing member extending generally radially outward from the annular sealing faces so as to define a pair of mating faces on opposing sides of the seam arranged for sealing engagement with one another when the sealing member surrounds the pipe.

The seam may extend generally radially outward at an inclination to a radial axis of the sealing member.

Preferably one of the mating faces of each seam comprises a groove extending between the first and second annular sealing faces and the other one of the mating faces comprises a protrusion extending between the first and second annular sealing faces which is arranged to be matingly received in the groove.

Preferably a bonding agent is used between the mating faces of each seam.

A clamp may extend circumferentially about the sealing member adjacent the first and second annular sealing faces at axially opposed ends of the sealing member.

Each of the annular sealing faces may comprise an annular groove receiving an uncured sealant material therein.

Preferably a rigid housing surrounds the sealing member and a clamp is provided which is arranged to compress the sealing member between the rigid housing and the leaking section over a full circumference thereof.

The housing may comprise an outer wall surrounding an outer wall of the sealing member and a pair of end walls spanning opposing ends of the sealing member between the annular sealing faces and the outer wall of the sealing member.

The outer wall of the sealing member may have an outer diameter in a relaxed and uncompressed state which is greater than an inner diameter of the outer wall of the housing such that the sealing member is arranged to be radially compressed by the housing when the housing is mounted about the sealing member.

There may be provided a lubricant material between an outer surface of the sealing member and an inner surface of the housing.

The housing may comprise two semi-circular sections arranged to be clamped onto opposing sides of the sealing member so as to fully surround the sealing member.

The housing may further comprise an outer wall surrounding an outer wall of the sealing member and a pair of end walls spanning opposing ends of the sealing member between the annular sealing faces and the outer wall of the sealing member in which each of the two semi-circular sections comprises a semi-circular portion of the outer wall and a semi-circular portion of each of the two end walls of the housing.

A rigid sleeve member is preferably arranged to be clamped directly about the pipe adjacent each of the annular sealing faces at opposing ends of the sealing member. The sleeve members may be formed integrally with the rigid housing.

When provided in combination with a pipe coupling between two pipe sections, each annular sealing face is preferably in sealing engagement about a respective one of the pipe sections and the envelope section preferably fully surrounds the pipe coupling about the full circumference of the pipe.

In the illustrated embodiment, the resilient sealing material comprises nitrile rubber, however other resilient sealing materials allowing seams to be adequately bonded to form a continuous envelope would also be suitable. When a plurality of sections of the sealing material comprise nitrile rubber bonded together, a preferred adhesive which adequately bonds the sections together is a thixotropic cyanoacrylate adhesive.

The repair device may be used in combination with a compressed air pipeline, or other similar pipes containing fluid therein under pressure.

Depending upon the application, the first and second annular sealing faces may be: i) coaxial with one another; ii) generally cylindrical about respective axes which are perpendicular to one another; or iii) generally cylindrical about respective axes which are angularly offset from one another.

Various embodiments of the invention will now be described in conjunction with the accompanying drawings in which.

BRIEF DESCRIPTION OF THE DRAWINGS

In the drawings like characters of reference indicate corresponding parts in the different figures.

DETAILED DESCRIPTION

Referring to the accompanying figures there is illustrated a pipe repair device generally indicated by reference numeral 10. The device 10 is well suited for sealing a leaking pipe coupling 12 between two pipe sections 14 of a pipe in a high pressure compressed air system, for example the type used in mining and the like. The common features of the various embodiments of the repair device 10 will first be described herein.

A typical pipe coupling 12 as shown in the illustrated embodiment comprises a coupling body 16 comprising two semicircular portions arranged to be clamped over top of the abutted ends of the pipe sections 14 to retain the pipes in abutted relation. An annular groove extends about the circumference of each of the pipe ends to receive an annular sealing member 18 clamped between the pipe and the surrounding coupling body 16 for sealing each of the pipe ends to the coupling body.

The pipe repair device 10 is arranged for surrounding a leaking section of a pipe including a damaged section, or a pipe coupling 12 which is leaking. The device 10 is particularly suited for surrounding the pipe coupling 12 such that the pipe coupling remains in place and continues to mount the two pipe sections in abutted relations while the device 10 forms a surrounding sealed enclosure which becomes pressurized by the leaking pipe coupling so as to reach equilibrium with the pressure in the pipe.

Figure 1:
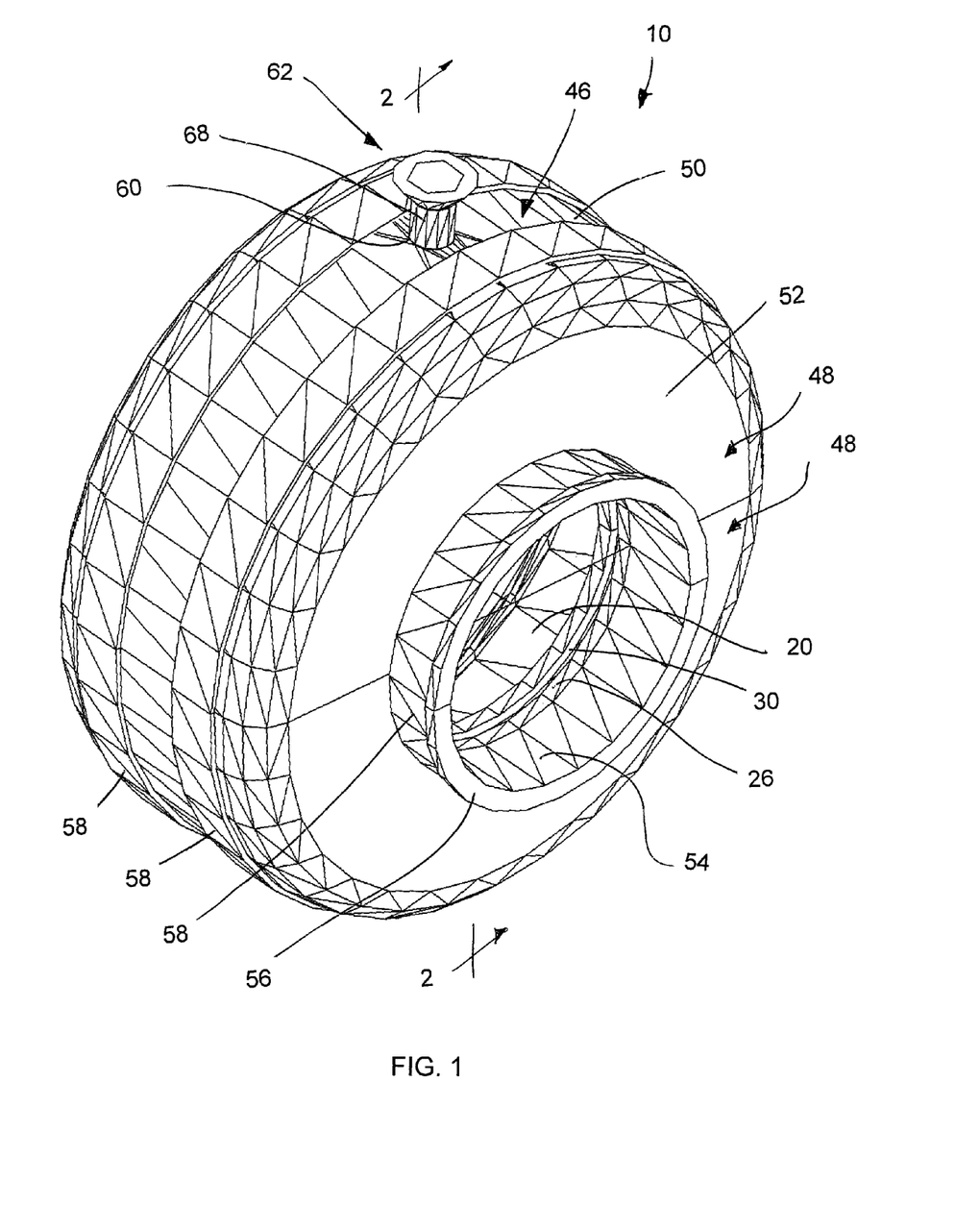
FIG. 1 is a perspective view of a first embodiment of the repair device.
Figure 2:
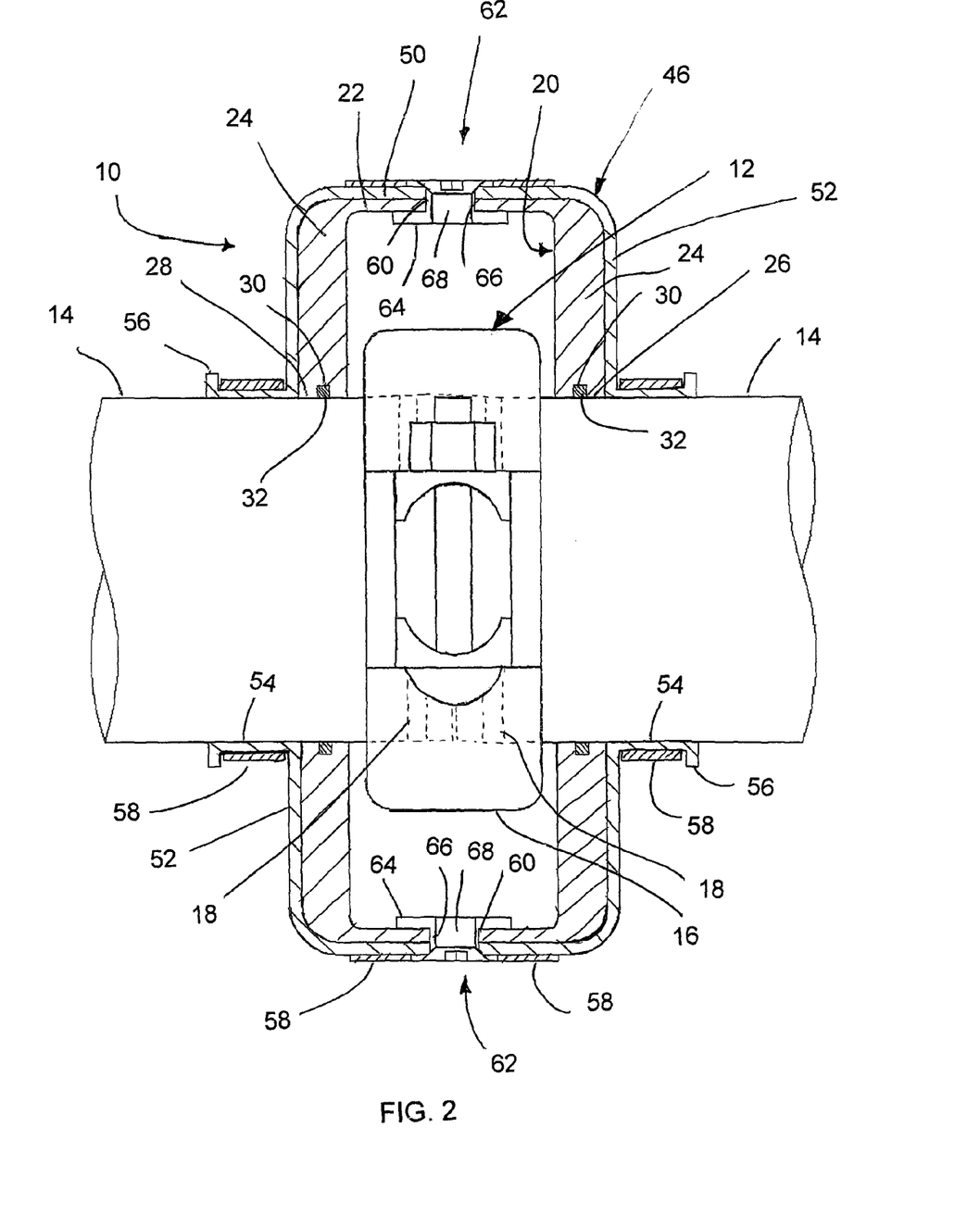
FIG. 2 is a sectional view along the line 2-2 of FIG. 1 shown mounted over top of a pipe coupling between two pipe ends.

The pipe repair device 10 according to the first embodiment primarily comprises a sealing member 20 which comprises a unitary member of resilient material throughout which is molded integrally as a single seamless member. The resilient material according to the preferred embodiment comprises nitrile rubber; however other resilient materials which resist degradation when in contact with oil from compressed air lines would be suitable.

Figure 4:
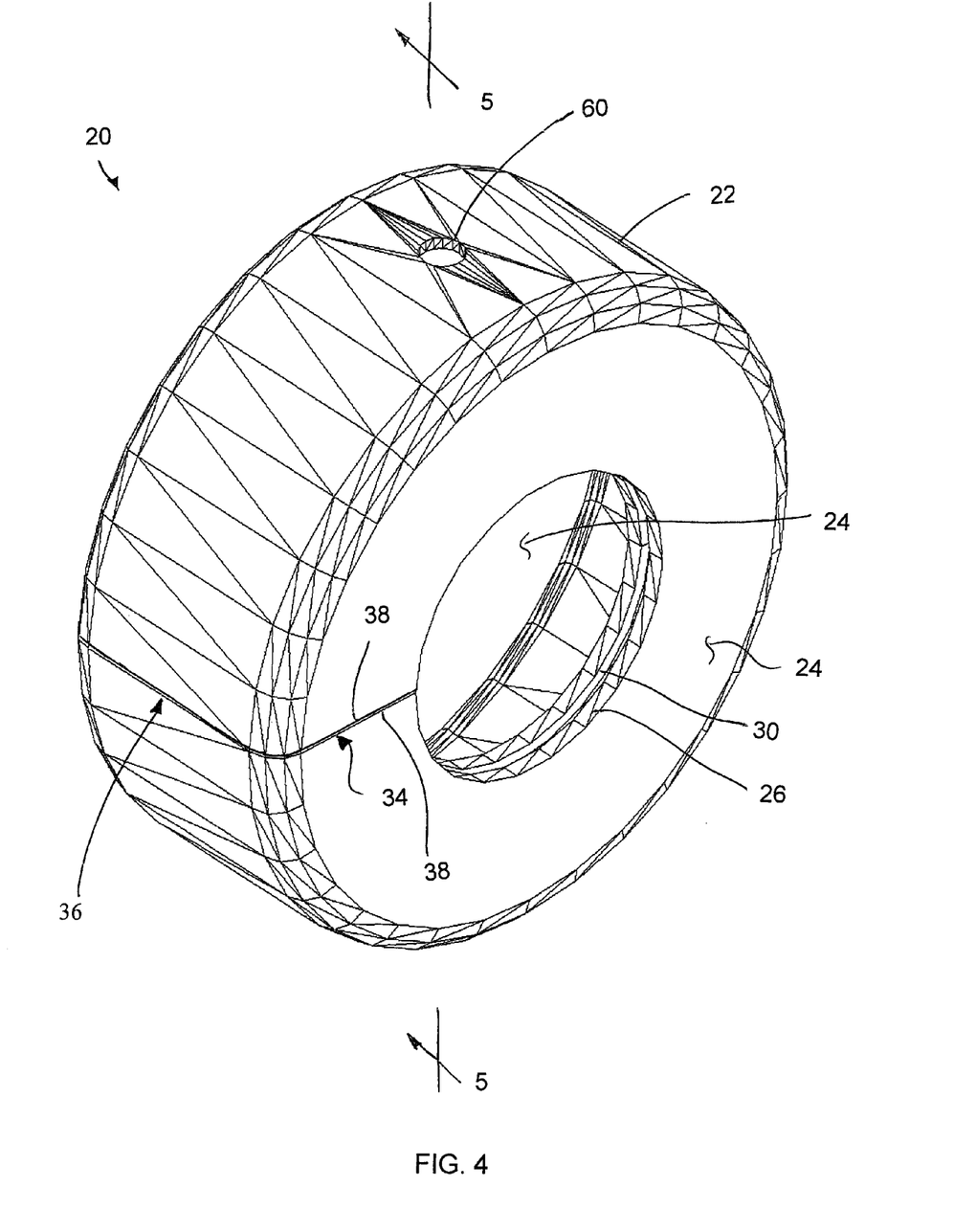
FIG. 4 is a perspective view of the sealing member according to the repair device of FIG. 1.
Figure 5:
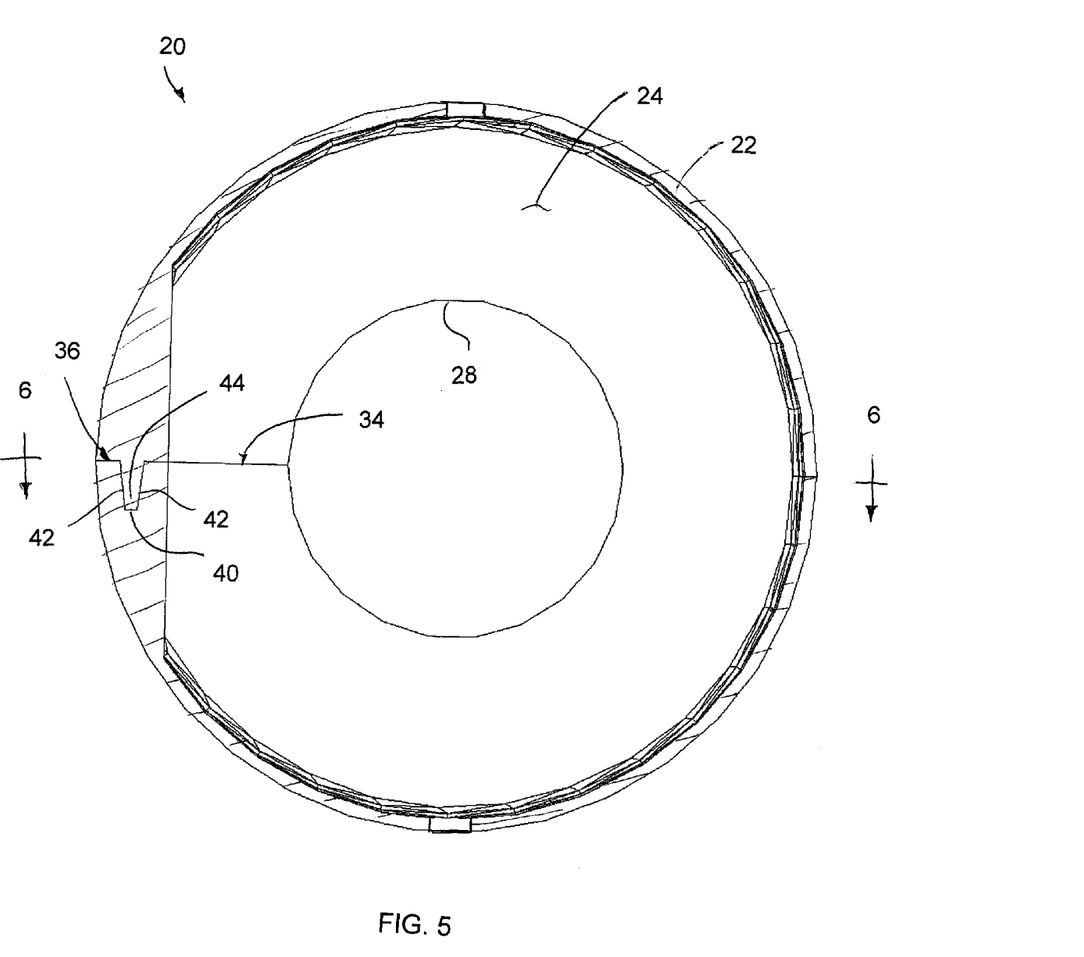
FIG. 5 is a sectional view along the line 5-5 of FIG. 4.

The sealing member 20 integrally comprises an outer wall 22 and two end walls 24 seamlessly joined therewith. The outer wall 22 is generally cylindrical in shape to extend a full circumference about the pipe coupling of the pipe by having an inner diameter which is larger than the diameter of the coupling to be spaced radially outward therefrom. The outer wall similarly extends in the axial direction of the pipe a distance which is only slightly greater and near to the axial width of the pipe coupling.

The two end walls 24 are joined at opposing ends of the outer wall 22 about the full circumference thereof to span perpendicularly to the axial direction of the pipe and the outer wall to enclose opposing ends of a hollow interior surrounded by the sealing member.

One of the two end walls spans radially inward from the outer wall to an inner edge which forms a first annular sealing face 26, while the other end wall spans radially inward from the opposing end of the outer wall to a respective inner edge defining a second annular sealing face 28. Each of the annular sealing faces is arranged for sealing engagement with the pipe about the full circumference thereof at respective opposing sides of the leaking pipe coupling to be repaired. The two end walls are spaced apart from one another in an axial direction by the width of the outer wall in the axial direction due to the parallel configuration of the two end walls relative to one another. Accordingly, the first annular sealing face 26 is in sealing engagement with the pipe on one side of the leaking section while the second annular sealing face is engagement about the full circumference of the pipe on the other side of the leaking section.

Each of the first and second annular sealing faces is cylindrical in shape so as to be coaxial with the outer wall and one another. Each of the annular sealing faces includes an annular groove 30 which is centered in the axial direction between the inner and outer surfaces of the respective end walls such that the groove is spaced in the axial direction from both surfaces of the end wall. The groove 30 is arranged to receive uncured sealing material 32 therein to fill the groove and form an adhesive sealing bond between the annular sealing face and the pipe upon which it is engaged in use. The sealing material 32 is arranged to be cured in place onto the pipe when mounting the repair device in place.

Once the first and second annular sealing faces are in sealing engagement with respective sections of the pipe, the end walls span from the sealing faces at the pipe to the outer wall integrally formed therewith such that the outer wall the two end walls together define an envelope section of the sealing member which fully surrounds the hollow interior locating the leaking pipe coupling therein. By forming the end walls and the outer wall of the sealing member as a single unitary member integrally formed of like material throughout, the only sealing interface is at the annular sealing faces about the pipe to minimize the opportunities for leakage as compared to prior art sealing devices.

To assist in mounting the sealing member onto the pipe, a radially extending seam extends fully through the sealing member so that the overall sealing member is accordingly generally c-shaped having sufficient resiliency to be stretched over top of the pipe sections. More particularly a first slot 34 is formed at one location at the outer wall which is oriented substantially parallel to the axial direction spanning between inner and outer surfaces of the outer wall as well as spanning between opposing ends of the outer wall where the first slot joins respective second slots 36 in the end walls. The second slots in the end walls are oriented in a radial direction between the respective sealing face and the first slot in the outer wall so that the first and second slots together form two generally u-shaped mating faces 38 arranged for abutment with one another when closing the c-shaped sealing member about a pipe such that the sealing member forms a single annular formation about the full circumference about the pipe.

Figure 6:
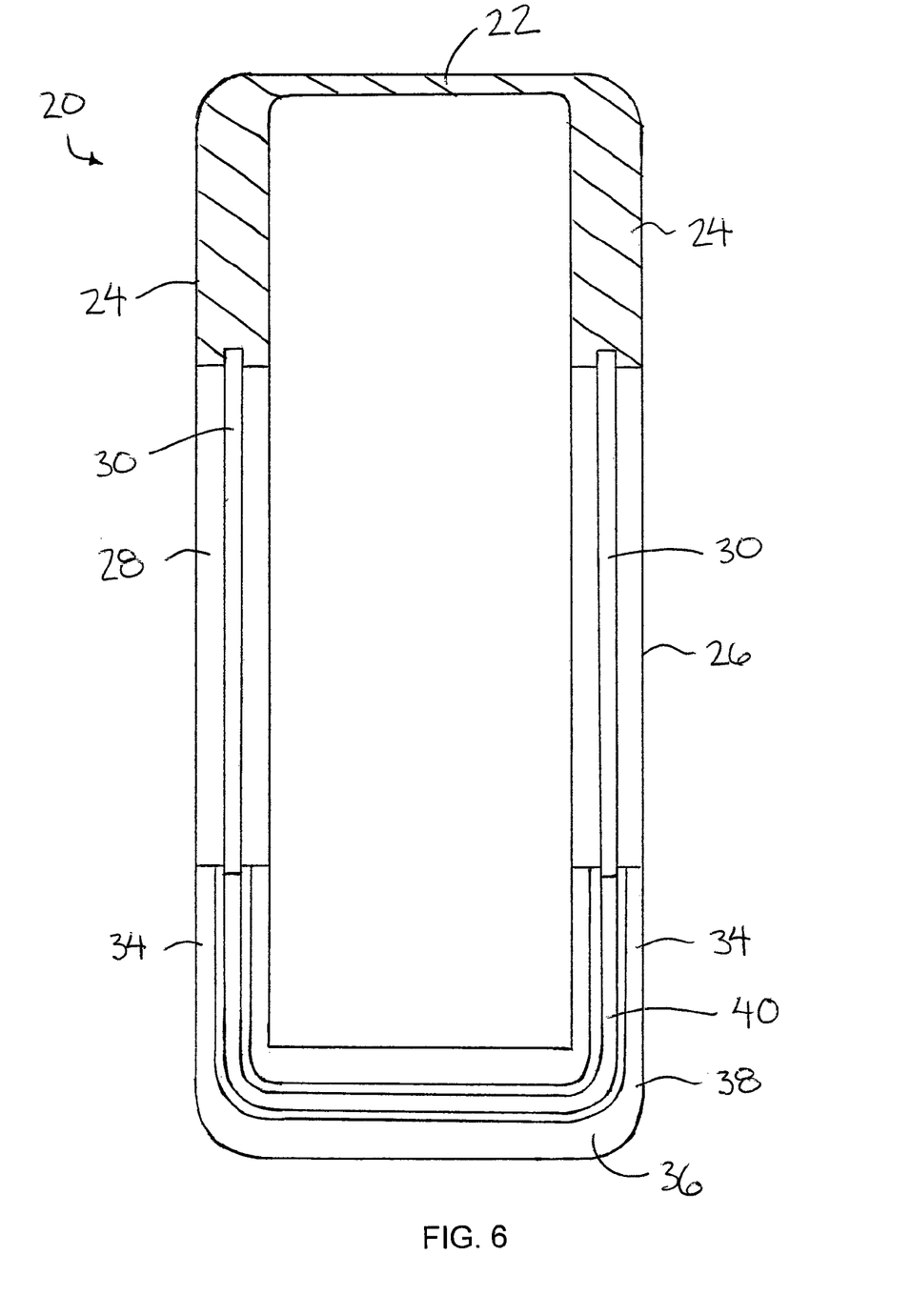
FIG. 6 is a sectional view along the line 6-6 of FIG. 5.
Figure 7:
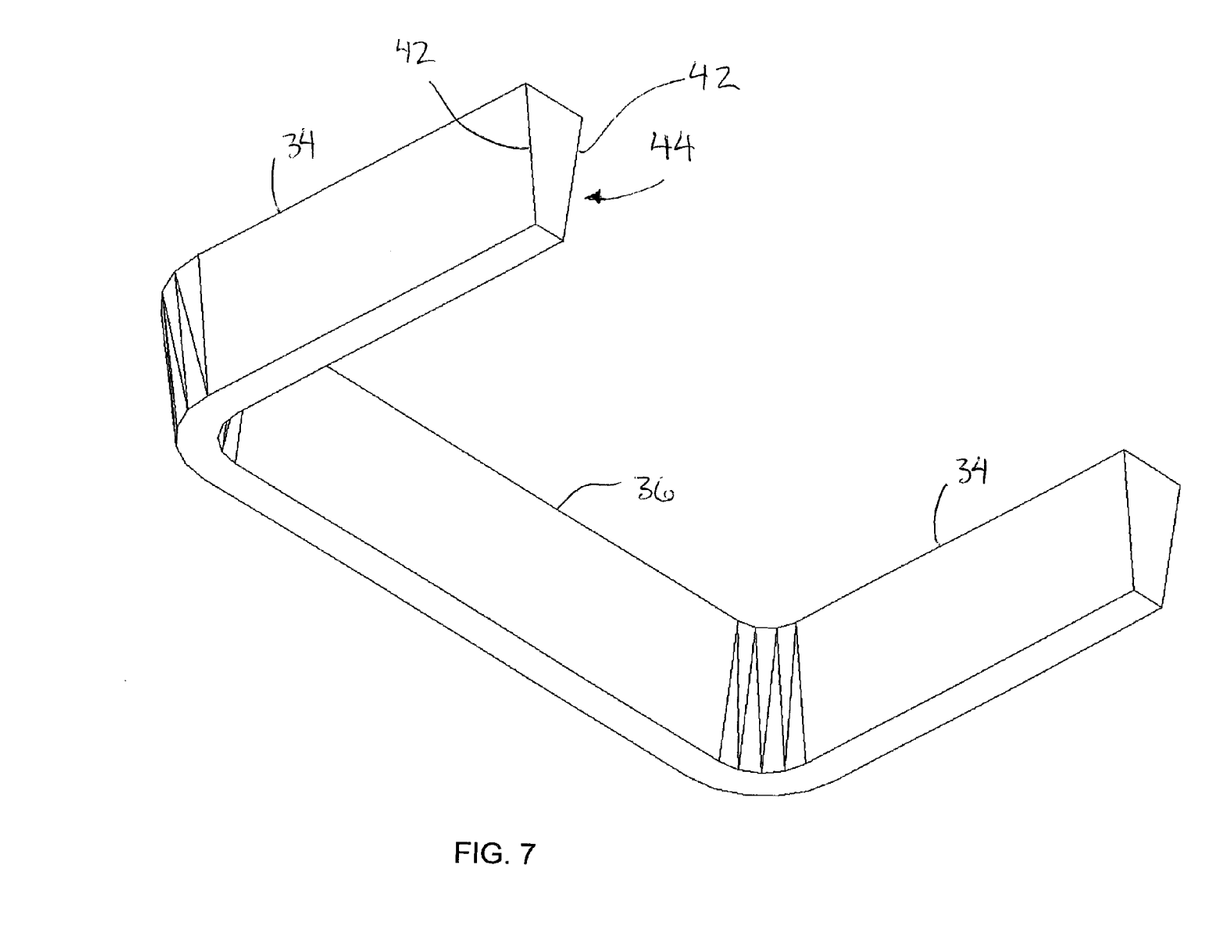
FIG. 7 is a perspective view of the projection formed on one of the mating surfaces of the sealing member according to the repair device of FIG. 1.

One of the mating faces 38 includes a groove 40 formed therein in which the groove includes a base portion in the outer wall and two side portions in the respective ends walls so as to be generally u-shaped in plan view as shown in FIG. 6. The groove in cross section comprises two side walls 42 which taper downwardly and inwardly towards one another to receive a projection 44 formed on the other one of the two mating faces 38 to be wedged therein. The projection 44 is also formed continuously along the respective mating face to comprise a base section on the outer wall and two side sections on the two ends walls for alignment with the groove 40 in the other mating face. The projection 44 in cross section also comprises two side walls 42 which taper downwardly and inwardly towards one another towards the free end of the projection for matching the profile of the groove 40 within which it is to be received in the mounted position.

As the groove and projection are formed of the same material as the remainder of the sealing member with which it is integrally formed, the groove and projection and remainder of the mating faces 38 are well suited for forming a strong sealing bond therebetween using an uncured sealant or adhesive for bonding like resilient materials together. The wedging configuration of the projection 44 received within the groove 40 increases the sealing pressure between the two mating faces 38 of the sealing member mounted about a leaking section of a pipe.

Figure 3:
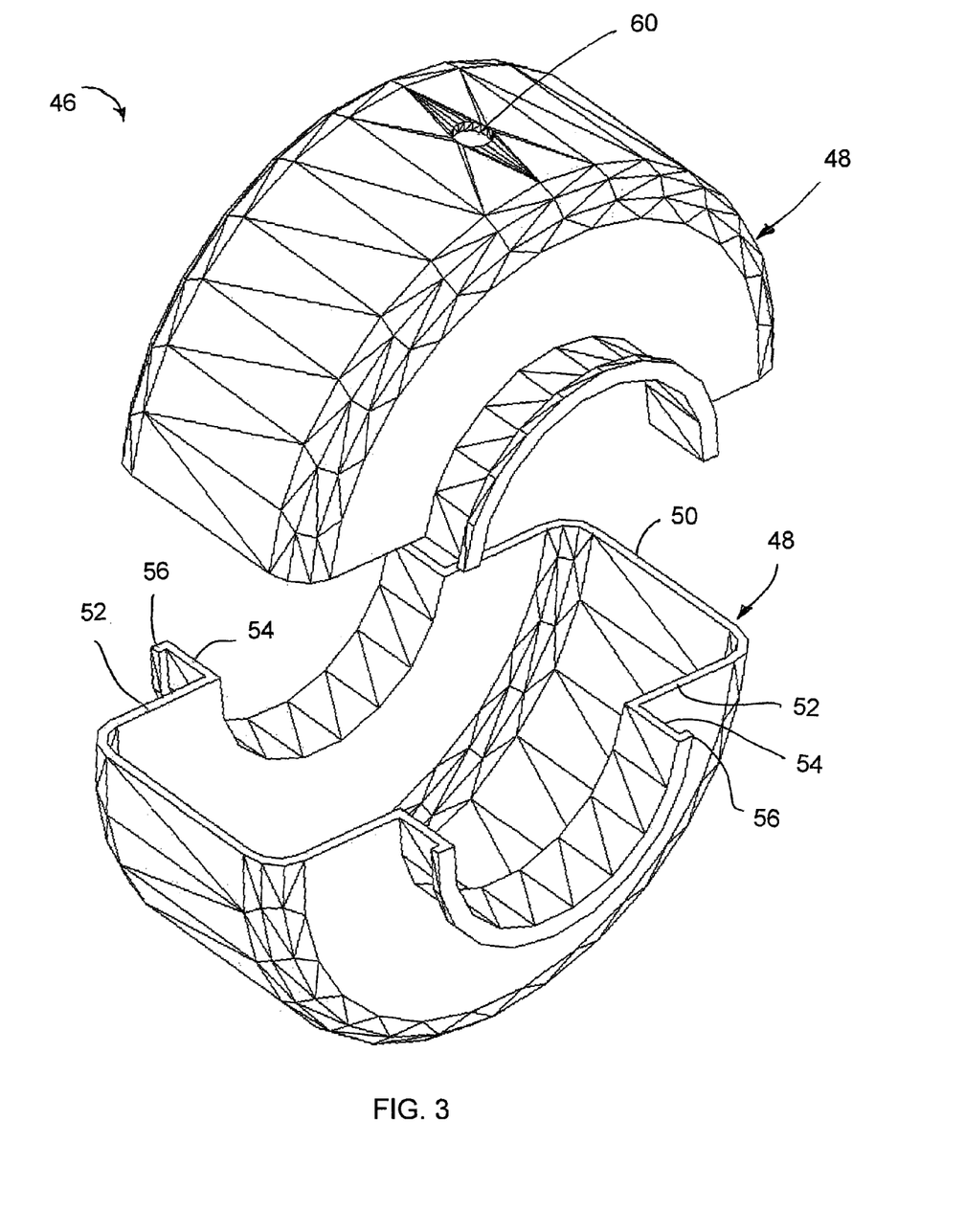
FIG. 3 is an exploded perspective view of the housing for surrounding the sealing member of the repair device of FIG. 1.

The device 10 further comprises a housing 46 which surrounds the sealing member to reinforce the sealing member in its mounted position on a pipe. Due to the resilient nature of the sealing member, the housing 46 prevents the outward stretching and bulging of the sealing member when the hollow interior thereof is exposed to the high pressure of the pipe being repaired. The housing is typically formed of rigid metal, for example stainless steel or a powder coated metal to resist corrosion.

The housing 46 comprises two symmetrical portions 48 which are generally semi-circular in shape so that when joined together they extend about the full circumference of the sealing member. When the two portions are assembled together, the housing 46 defines and outer wall 50 which is generally cylindrical in shape and which extends about the full circumference of the outer wall of the sealing member by having a width in the axial direction corresponding approximately to the width of the sealing member and by having an inner diameter which corresponds approximately to the outer diameter of the sealing member. The housing 46 further comprises two end walls 52 in its assembled configuration in which the two end walls are perpendicular to the axial direction and are spaced apart from one another at opposing ends of the outer wall 50 to similarly span the outer sides of the end walls 24 of the sealing member.

The housing 46 further comprises two sleeve portions 54 formed integrally with the two end walls 52 to extend outward therefrom in the axial direction at opposing ends of the housing. The sleeve portions 54 of the assembled housing are arranged to extend about a full circumference of the pipe while having an interior diameter which closely matches the outer diameter of the pipe upon which it is mounted so that the sleeve portions 54 are arranged to be clamped directly about the pipe sections adjacent respective outer sides of the end walls of the sealing member in sealing engagement with the pipe. The end walls 52 of the housing are thus arranged to span radially between the respective sleeve portions 54 and the outer wall perpendicularly to the axial direction. Each of the sleeve portions 54 further comprises an end flange 56 which is also perpendicular to the axial direction and which extends radially outward from the outer end of the sleeve portion.

The separation of the housing in two symmetrical portions 48 results in each of the two portions 48 comprising a respective semi-circular portion of both sleeve portions 54, both end walls 52 and the outer wall 50, all formed integrally with one another as a single rigid metal member of like materials throughout. The two portions 48 are identical to one another so as to be interchangeable with one another.

To mount the device in place and retain the repair device on the pipe, clamps are provided for clamping the sealing member and the surrounding housing in a circumferential direction onto the pipe. The clamps comprise four clamping rings 58 in the illustrated embodiments. One clamping ring is mounted about each sleeve portion 54 to fully span the axial width of the sleeve portion between the respective end wall and respective end flange 56. The two remaining clamping rings 58 extend about the outer wall of the housing 46 adjacent opposing ends thereof such that the clamping force of the two clamping rings on the outer wall are arranged to be concentrated radially inwardly along the end walls of the sealing member to increase the sealing pressure between the first and second annular sealing faces and the pipe.

Each of the clamping rings 58 extends about a full circumference of the housing and is arranged to constrict in a circumferential direction for both damping the first and second sealing faces against the pipe and for clamping the two sleeve portions 54 against the pipe adjacent respective end walls of the sealing member. Clamping of the sleeve portions prevents outward bulging in the axial direction of the end walls of the sealing member to fix the sealing member in the axial direction in addition to the radially inward clamping force provided by the clamping rings on the outer wall.

In the illustrated embodiment two vent apertures 60 are provided at diametrically opposed locations through the outer wall of both the sealing member and the housing, however, more or less vent apertures may be provided in further embodiments. Each of the vent apertures 60 extends fully through the sealing material of the sealing member between the inner and outer surfaces of the outer wall at a centered position in the axial direction. When two vent apertures are provided diametrically opposite one another, the vent apertures are evenly spaced relative to one another in the circumferential direction.

Each vent aperture 60 includes a vent member 62 mounted therein arranged to selectively control communication between the hollow interior and surrounding exterior through the vent aperture. Each vent member includes a sealing flange 64 which overlaps an inner surface of the sealing member about the vent aperture. An internally threaded collar 66 is integrally joined with the sealing flange 64 to extend into the vent aperture for threaded connection to a vented bolt 68. The vented bolt includes a through venting passage formed therein between the inner end of the bolt and an outlet in the threaded section of the bolt such that the outlet is moveable with the bolt between an open position at the exterior of the device and a closed position in overlapping engagement with the threaded collar 66 which seals the vent passage closed. When tightening the vented bolt 68 into the threaded collar, the head of the bolt at the exterior of the housing applies a clamping pressure between the sealing flange 64 and the inner surface of the sealing member to seal the vent member with the sealing member about the full periphery of the vent aperture.

In use the sealing member, including the outer wall and the two ends walls is formed as a single integral member with a single radial set of first and second slots therein so that the c-shaped sealing member can be resiliently placed about the full circumference of a pipe coupling between two pipe sections.

Suitable sealant material in an uncured form is placed in the grooves in the first and second annular sealing faces for curing and contact with the pipe in the mounted position of the sealing member. An additional adhesive sealant is placed on the mating faces of the sealing member such that the sealing member forms a continuous resilient sealing surface surrounding the leaking section of the pipe.

The housing and clamps are mounted about the sealing member to fully surround the sealing member with the vent members initially in the open position. The clamps are used to both apply radial clamping pressure to the end walls of the sealing member to clamp the first and second annular sealing faces about the pipe, as well as to apply clamping force to the sleeved portions of the housing at opposing ends of the sealing member to provide support to the sealing member in the axial direction. Once the sealant in the annular grooves and at the mating faces has cured, the vent members can be tightened into their closed position. Additional sealant may be placed about the threads of the vent member to enhance the sealing ability of the vent members in the closed position.

Figure 8:
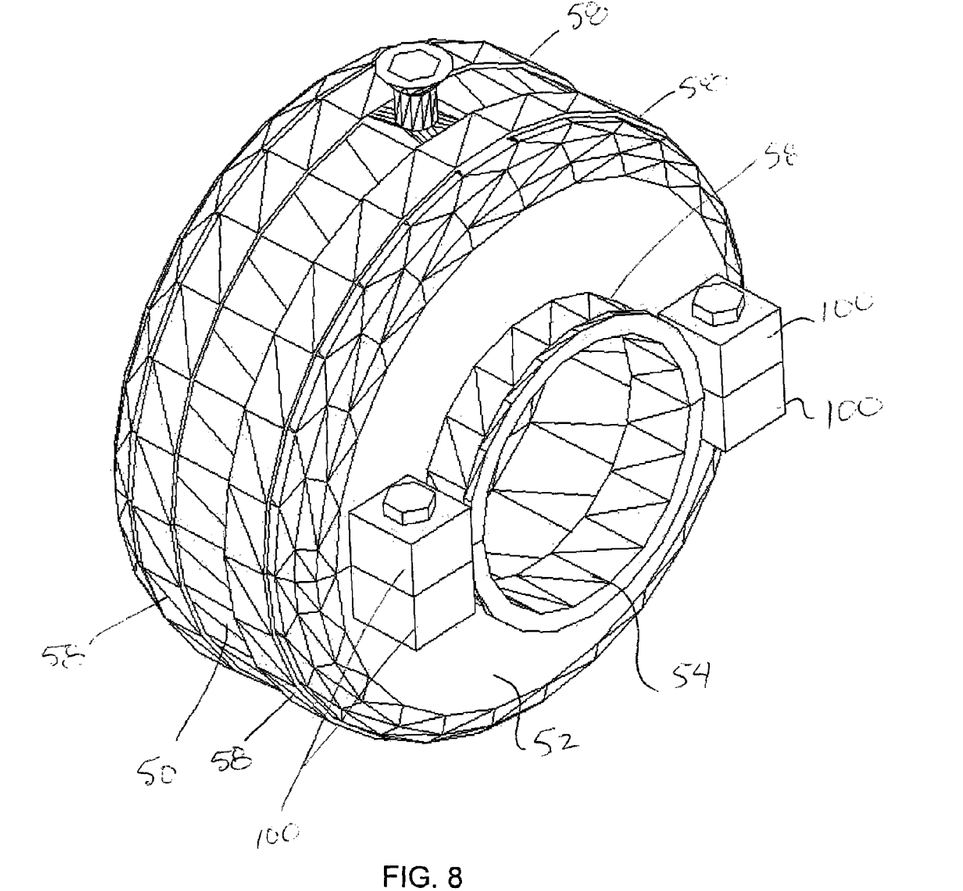
FIG. 8 is a perspective view of a second embodiment of the repair device.
Figure 9:
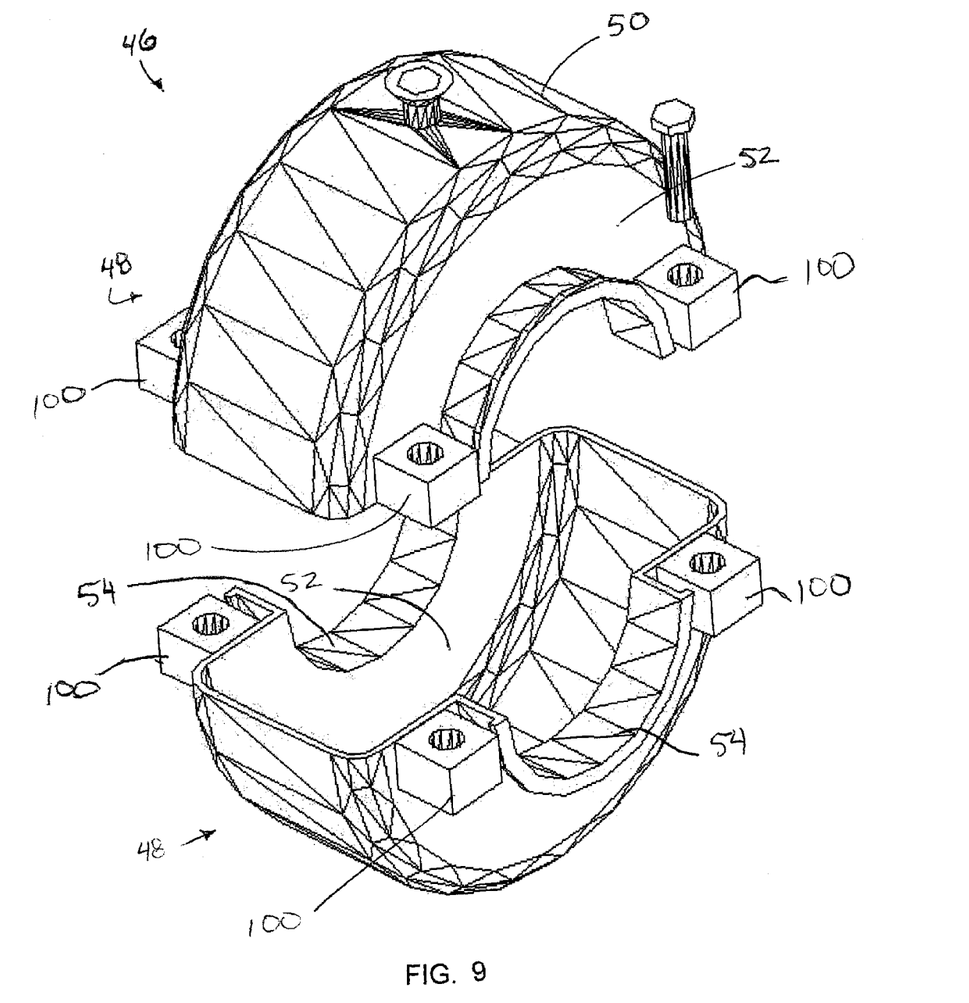
FIG. 9 is an exploded perspective view of the housing for surrounding the sealing member of the repair device of FIG. 8.
Figure 10:
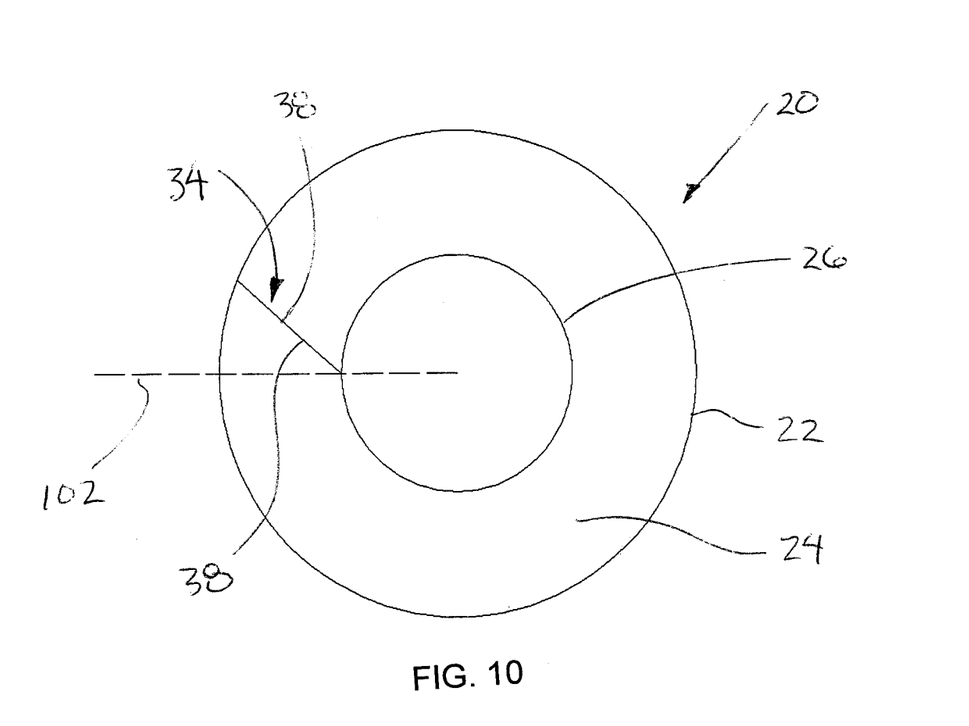
FIG. 10 is an elevational view of the sealing member according to FIG. 8.

Turning now to the embodiment of FIGS. 8 through 10, the second embodiment of the repair device 10 is substantially identical to the previous embodiment of FIGS. 1 through 7 as described above with the exception of the following features.

In the second embodiment, each of the two symmetrical portions 48 of the housing 46 is provided with a pair of fastener mounts 100 at diametrically opposed locations adjacent the seam. Each of the fastener mounts 100 comprises a rigid protrusion of material projecting outward from the end wall 52 in the axial direction of the housing. The fastener mounts are located adjacent to the seam between the two symmetrical portions 48 such that when the two symmetrical portions are brought together the fastener mounts of one portion 48 are aligned with and directly adjacent corresponding fastener mounts 100 of the opposing portion 48. Cooperating apertures through the fastener mounts permit fasteners to be fastened between the two symmetrical portions at diametrically opposed locations at each of the two opposing end walls 52 of the housing. The fasteners connected between the fastener mounts 100 provides additional clamping force to clamp the two symmetrical portions 48 towards one another about the sealing member received therein in addition to the clamping force provided by the clamping rings 58.

To increase the clamping force of the sealing member about the pipe, the outer diameter of the sealing member at the outer wall 22 thereof may be arranged to be greater than the interior diameter of the outer wall 50 of the housing 46 when the sealing member is in a relaxed and uncompressed state. Accordingly mounting the housing about the sealing member requires the sealing member to be compressed radially inward by the housing which in turn increases the clamping force of the sealing member against the pipe which the annular sealing faces of the sealing member are engaged about.

To ensure an even distribution of compressive force from the housing to the sealing member received and compressed therein between the housing and pipe, the inner surfaces of the outer wall and end walls of the housing 46 may include a layer of lubricant material thereon for engagement with the corresponding outer surfaces of the outer wall and end walls of the sealing member 20. In this manner, the housing is readily slidable relative to the sealing member received therein as the housing is mounted over top of the sealing member and clamped into position with the sealing member being radially compressed by the housing once mounted about the pipe about the full circumference thereof. The lubricant is primarily located about the outer diameter of the sealing member between the outer wall of the sealing member and the outer wall of the housing. Minimal or no lubricant may be required between the end walls of the sealing member and housing.

In further embodiments, the fastener may comprise various forms of fasteners other than the bolts described which are capable of securing the sections of the housing together with the sealing member under compression between the leaking section of the pipe and the housing, for example rivets or crimping type fasteners.

To increase the bonding between the two u-shaped mating faces 38 of the sealing member, the first slots 34 formed in the end walls of the sealing member may be oriented to be angularly offset from a radial axis 102 of the sealing member as shown in FIG. 10. As a result of the angularly offset orientation of the seam spanning generally radially outward from the annular sealing faces to the outer wall of the sealing member, some of the radially compressive force applied by the housing surrounding the sealing member acts transversely to the orientation of the first slots to clamp the two mating faces 38 against one another as opposed to the first slot and the radial direction being aligned as in the first embodiment.

In yet further embodiments, the cross sectional shape of the groove 40 and projection 44 received therein at the mating faces 38 may be varied such that the two side walls 42 of the projection may be oriented at various inclinations relative to one another or may be varied in profile to be curved or other suitable shapes which ensure a mating connection between the two sealing faces 38.

Figure 11:
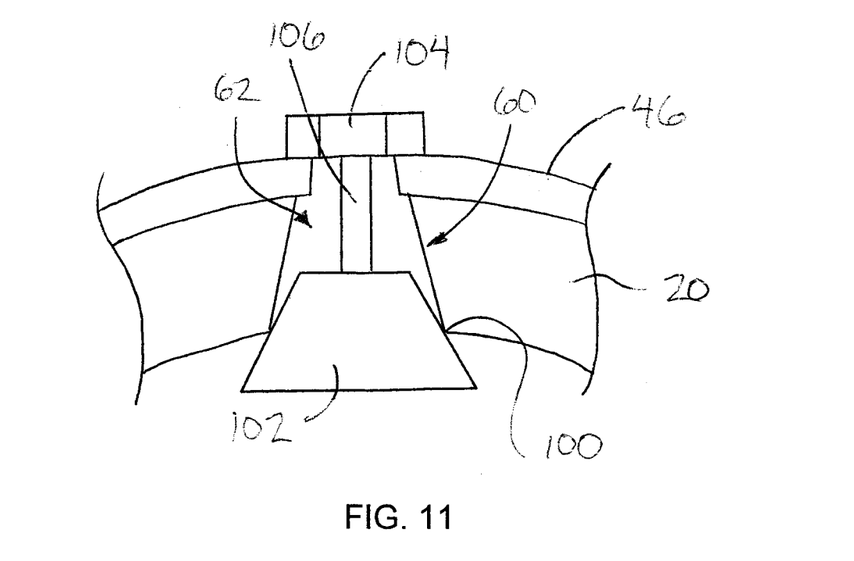
FIG. 11 is a partly sectional elevational view of an alternative embodiment of the vent member.

Turning now to FIG. 11, there is illustrated a further embodiment of the vent member 62 for closing the vent aperture 60. In this instance, the vent aperture defines a valve seat 100 about the periphery of the aperture at the inner side of the resilient sealing material. The aperture tapers inwardly to be reduced in diameter from the valve seat at the interior side to an exterior side of the sealing material which is overlapped about the periphery thereof by the outer wall of the housing. The housing also includes an aperture therein which is in alignment with the vent aperture. The valve member 62 in this instance is arranged for sealing engagement with the valve seat by displacing the valve member outwardly in a radial direction from an open position spaced radially inwardly from the valve seat to a closed position wedged into the vent aperture in engagement with the valve seat. The valve member comprises a wedge 102 which reduces in diameter in the radial direction of the repair device from an inner end larger in diameter than the valve seat to an outer end which is smaller in diameter than the valve seat. The valve member is tapered more aggressively than the aperture such that the valve seat at the inner side is always engaged with the vent member in the closed position.

The valve member also comprises a fastener 104 in the form of a nut in abutment with the exterior of the housing at the exterior side of the vent aperture in the resilient material. A threaded stem 106 between the wedge 102 and the fastener 104 allows a portion of the resilient sealing material about the vent aperture to be clamped between the fastener and the wedge in the closed position of the vent member in which the wedge 102 is effectively wedged in the vent aperture. Tightening of the fastener 104 pulls the stem and wedge radially outward to seal the wedge more tightly in the vent aperture. Loosening the fastener 104 allows the distance between the fastener 104 and the wedge to be increased to accommodate a venting passage between the wedge and the valve seat at the interior and between the fastener and the housing at the exterior.

Figure 12:
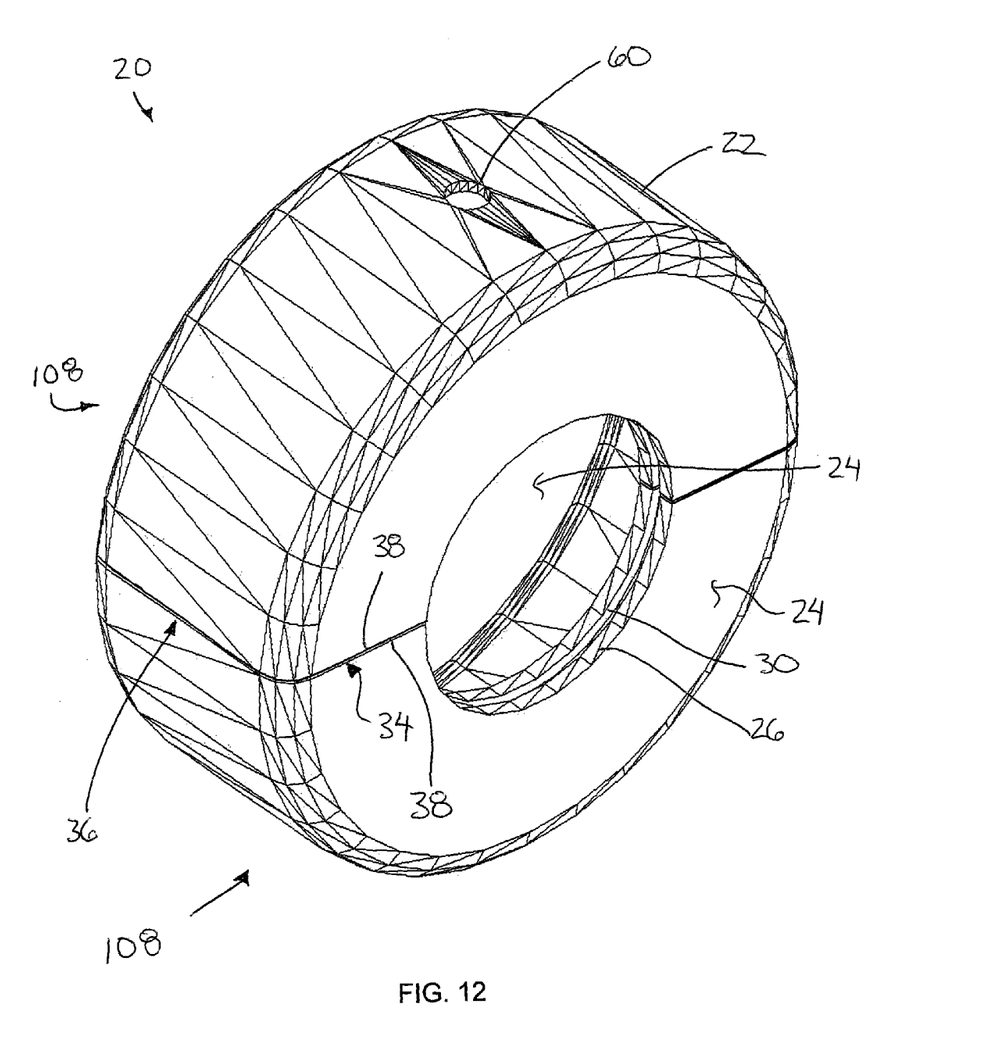
FIG. 12 is a perspective view of a further embodiment of the sealing member.

Turning now to FIG. 12, there is illustrated a further embodiment of the sealing member 20 in which the member 20 is comprises two circumferential sections 108, though more sections may be provided for added convenience of placing the member about a leaking pipe section if desired. In this instance, each circumferential section 108 comprises a circumferential section of the envelope section which extends partway about a circumference of the leaking section as well as a respective portion of each of the first and second annular sealing faces which is integrally joined therewith. More particularly, each circumferential section comprises a portion of the outer cylindrical wall and each end wall of the envelope section. The circumferential sections are separated by seam which have mating faces 38 abutted with one another to integrally join the mating faces in the manner described above with regard to sealing of the seam in the first embodiment.

In either of the illustrated embodiments, the sealing member is formed of nitrile rubber. It is suited to environments where the may be some oil contact.

To bond the seams in the nitrile rubber, one suitable adhesive or bonding material is available under the tradename Permabond 2011 Cyanoacrylate. This material is a thixotropic, fast setting cyanoacrylate particularly suitable for use on vertical and porous substrates. Cyanoacrylate adhesives are single component adhesives that polymerize rapidly when pressed into a thin film between parts. The moisture adsorbed on the surface initiates the curing of the adhesive. Strong bonds are developed extremely fast.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A repair device for repairing a leaking section in a pipe, the repair device comprising:

a sealing member comprising a first annular sealing face arranged for sealing engagement with the pipe about a full circumference thereof on one side of the leaking section, a second annular sealing face arranged for sealing engagement with the pipe about the full circumference thereof on the other side of the leaking section, and an envelope section spanning between the first and second annular sealing faces;

the envelope section being arranged to fully surround the leaking section of the pipe about the full circumference of the pipe between the first and second annular sealing faces;

the envelope section, the first annular sealing face, and the second annular sealing face comprising resilient sealing material and being integrally joined with one another;

a clamp extending circumferentially about the sealing member so as to be arranged to clamp the sealing member circumferentially about the pipe; and at least one vent aperture communicating through the resilient sealing material of the sealing member, said at least one vent aperture including a vent member arranged to selectively close the vent aperture.

2. The device according to claim 1 wherein a periphery of said at least one vent aperture defines a valve seat at an inner side of the resilient sealing material, and wherein the vent member of said at least one vent aperture comprises a wedge arranged for sealing engagement with the valve seat and a fastener supported externally of the resilient sealing material so as to be arranged to clamp a portion of the resilient sealing material about the vent aperture between the fastener and the wedge in a closed position.

3. The device according to claim 1 wherein the envelope section comprises a plurality of circumferential sections, each circumferential section being arranged to extend partway about a circumference of the leaking section, and each circumferential section being integrally joined with a respective portion of each of the first and second annular sealing faces.

4. The device according to claim 3 wherein the plurality of circumferential sections are bonded to one another such that the envelope section, the first annular sealing face and the second annular sealing face form a single member of resilient material arranged to fully surround the leaking section of the pipe.

5. The device according to claim 1 wherein the envelope section comprises a cylindrical outer wall and a pair of end walls spanning radially between respective ones of the annular sealing faces and the outer wall.

6. The device according to claim 1 wherein there is provided at least one seam in the sealing member extending generally radially outward from the annular sealing faces so as to define a pair of mating faces on opposing sides of the seam arranged for sealing engagement with one another when the sealing member surrounds the pipe.

7. A repair device for repairing a leaking section in a pipe, the repair device comprising:

a sealing member comprising a first annular sealing face arranged for sealing engagement with the pipe about a full circumference thereof on one side of the leaking section, a second annular sealing face arranged for sealing engagement with the pipe about the full circumference thereof on the other side of the leaking section, and an envelope section spanning between the first and second annular sealing faces;

the envelope section being arranged to fully surround the leaking section of the pipe about the full circumference of the pipe between the first and second annular sealing faces;

the envelope section, the first annular sealing face, and the second annular sealing face comprising resilient sealing material and being integrally joined with one another;

the sealing member including at least one seam extending generally radially outward from the annular sealing faces so as to define a pair of mating faces on opposing sides of the seam arranged for sealing engagement with one another when the sealing member surrounds the pipe; and a clamp extending circumferentially about the sealing member so as to be arranged to clamp the sealing member circumferentially about the pipe;

wherein said at least one seam extends generally radially outward at an inclination to a radial axis of the sealing member.

8. A repair device for repairing a leaking section in a pipe, the repair device comprising:

a sealing member comprising a first annular sealing face arranged for sealing engagement with the pipe about a full circumference thereof on one side of the leaking section, a second annular sealing face arranged for sealing engagement with the pipe about the full circumference thereof on the other side of the leaking section, and an envelope section spanning between the first and second annular sealing faces;

the envelope section being arranged to fully surround the leaking section of the pipe about the full circumference of the pipe between the first and second annular sealing faces;

the envelope section, the first annular sealing face, and the second annular sealing face comprising resilient sealing material and being integrally joined with one another;

the sealing member including at least one seam extending generally radially outward from the annular sealing faces so as to define a pair of mating faces on opposing sides of the seam arranged for sealing engagement with one another when the sealing member surrounds the pipe; and a clamp extending circumferentially about the sealing member so as to be arranged to clamp the sealing member circumferentially about the pipe;

wherein one of the mating faces of said at least one seam comprises a groove extending between the first and second annular sealing faces and the other one of the mating faces of said at least one seam comprises a protrusion extending between the first and second annular sealing faces which is arranged to be matingly received in the groove.

9. The device according to claim 8 in combination with a bonding agent between the mating faces of said at least one seam.

10. The device according to claim 1 wherein there is provided a clamp extending circumferentially about the sealing member adjacent the first and second annular sealing faces at axially opposed ends of the sealing member.

11. A repair device for repairing a leaking section in a pipe, the repair device comprising:

a sealing member comprising a first annular sealing face arranged for sealing engagement with the pipe about a full circumference thereof on one side of the leaking section, a second annular sealing face arranged for sealing engagement with the pipe about the full circumference thereof on the other side of the leaking section, and an envelope section spanning between the first and second annular sealing faces;

the envelope section being arranged to fully surround the leaking section of the pipe about the full circumference of the pipe between the first and second annular sealing faces;

the envelope section, the first annular sealing face, and the second annular sealing face comprising resilient sealing material and being integrally joined with one another; and a clamp extending circumferentially about the sealing member so as to be arranged to clamp the sealing member circumferentially about the pipe;

wherein each of the annular sealing faces comprises an annular groove receiving an uncured sealant material therein.

12. A repair device for repairing a leaking section in a pipe, the repair device comprising:
a sealing member comprising a first annular sealing face arranged for sealing engagement with the pipe about a full circumference thereof on one side of the leaking section, a second annular sealing face arranged for sealing engagement with the pipe about the full circumference thereof on the other side of the leaking section, and an envelope section spanning between the first and second annular sealing faces;
the envelope section being arranged to fully surround the leaking section of the pipe about the full circumference of the pipe between the first and second annular sealing faces;
the envelope section, the first annular sealing face, and the second annular sealing face comprising resilient sealing material and being integrally joined with one another;
a rigid housing surrounding the sealing member; and
a clamp surrounding the sealing member so as to extend circumferentially about the sealing member and so as to be arranged to compress the sealing member between the rigid housing and the leaking section about a full circumference thereof and clamp the sealing member circumferentially about the pipe;
wherein the housing comprises an outer wall surrounding an outer wall of the sealing member and a pair of end walls spanning opposing ends of the sealing member between the annular sealing faces and the outer wall of the sealing member.

13. The device according to claim 12 wherein the outer wall of the sealing member has an outer diameter in a relaxed and uncompressed state which is greater than an inner diameter of the outer wall of the housing such that the sealing member is arranged to be radially compressed by the housing when the housing is mounted about the sealing member.

14. A repair device for repairing a leaking section in a pipe, the repair device comprising:
a sealing member comprising a first annular sealing face arranged for sealing engagement with the pipe about a full circumference thereof on one side of the leaking section, a second annular sealing face arranged for sealing engagement with the pipe about the full circumference thereof on the other side of the leaking section, and an envelope section spanning between the first and second annular sealing faces;
the envelope section being arranged to fully surround the leaking section of the pipe about the full circumference of the pipe between the first and second annular sealing faces;
the envelope section, the first annular sealing face, and the second annular sealing face comprising resilient sealing material and being integrally joined with one another;
a rigid housing surrounding the sealing member;
a clamp surrounding the sealing member so as to extend circumferentially about the sealing member and so as to be arranged to compress the sealing member between the rigid housing and the leaking section about a full circumference thereof and clamp the sealing member circumferentially about the pipe; and
a lubricant material between an outer surface of the sealing member and an inner surface of the housing.

15. The device according to claim 12 wherein the housing comprises two semi-circular sections arranged to be clamped onto opposing sides of the sealing member so as to fully surround the sealing member.

16. The device according to claim 15 wherein the housing comprises an outer wall surrounding an outer wall of the sealing member and a pair of end walls spanning opposing ends of the sealing member between the annular sealing faces and the outer wall of the sealing member, each of the two semi-circular sections comprising a semi-circular portion of the outer wall and a semi-circular portion of each of the two end walls of the housing.

17. A repair device for repairing a leaking section in a pipe, the repair device comprising:
a sealing member comprising a first annular sealing face arranged for sealing engagement with the pipe about a full circumference thereof on one side of the leaking section, a second annular sealing face arranged for sealing engagement with the pipe about the full circumference thereof on the other side of the leaking section, and an envelope section spanning between the first and second annular sealing faces;
the envelope section being arranged to fully surround the leaking section of the pipe about the full circumference of the pipe between the first and second annular sealing faces;
the envelope section, the first annular sealing face, and the second annular sealing face comprising resilient sealing material and being integrally joined with one another;
a clamp extending circumferentially about the sealing member so as to be arranged to clamp the sealing member circumferentially about the pipe; and
a rigid sleeve member arranged to be clamped directly about the pipe adjacent each of the annular sealing faces at opposing ends of the sealing member.

18. The device according to claim 17 wherein there is provided a rigid housing surrounding the sealing member and wherein the sleeve members are formed integrally with the rigid housing.

19. The device according to claim 1 in combination with a pipe coupling between two pipe sections wherein each annular sealing face is in sealing engagement about a respective one of the pipe sections and the envelope section fully surrounds the pipe coupling about the full circumference of the pipe.

* * * * *